Figure 4:
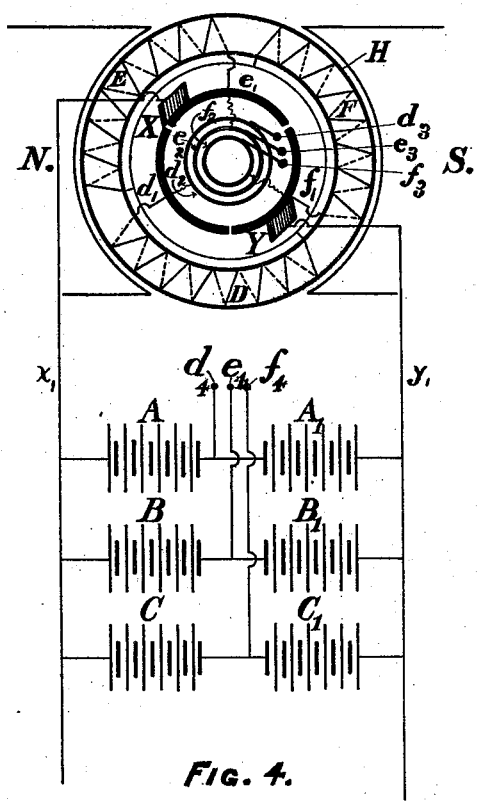

No. 692,432. Patented Feb. 4, 1902.
H. H. DOW.
APPARATUS FOR THE PREVENTION OF SPARKING AND ARCING IN ELECTRIC CIRCUITS.
(Application filed Mar. 13, 1899.)
(No Model.)

WITNESSES.
D. Davies
A. E. Merkel

H. H. Dow INVENTOR.
BY J. B. Fay ATTORNEY.

UNITED STATES PATENT OFFICE.

HERBERT H. DOW, OF MIDLAND, MICHIGAN.

APPARATUS FOR THE PREVENTION OF SPARKING AND ARCING IN ELECTRIC CIRCUITS.

SPECIFICATION forming part of Letters Patent No. 692,432, dated February 4, 1902.

Application filed March 13, 1899. Serial No. 708,796. (No model.)

*To all whom it may concern:*

Be it known that I, HERBERT H. DOW, a citizen of the United States, and a resident of Midland, county of Midland, and State of Michigan, have invented a new and useful Improvement in Apparatus for the Prevention of Sparking and Arcing in Electric Circuits, of which the following is a specification.

The object of my invention is to obviate the difficulties occasioned by arcing and self-induction when an electric circuit is suddenly opened.

The operation of my invention depends upon the fact that if an electric current be passed through an electrolyte between two insoluble electrodes the latter become polarized as the decomposition of the electrolyte proceeds. This polarization, starting at zero, rises rapidly to a limiting value, depending upon the character of the electrolyte, and manifests itself as an electromotive force counter to that of the polarizing-current the passage of which it resists. If a sufficient number of such electrolytic couples be connected in series, so that the polarization electromotive force of the battery equals or exceeds that of the polarizing-current, then this battery will be capable of entirely stopping the polarizing-current if connected in opposition to it. If an unpolarized battery of this description be switched into the electric circuit, the counter electromotive force will rise rapidly from a zero value to that of the polarizing-current and will gradually yet quickly check and stop said polarizing-current, as by a cushion effect. To secure the operation of this principle in preventing destructive arcing across the gap in an electric circuit when it is suddenly opened, I connect such a battery of cells in shunt around the proposed break. In the normal condition of this arrangement the circuit is closed and the battery short-circuited through that part of the circuit in which the break is to occur. In this condition the battery will be nearly or quite depolarized and discharged, since the difference of potential at its terminals is equal only to the slight drop in potential in that part of the main circuit around which it is shunted. This drop will depend upon the resistance of the shunted part of the circuit, which will in all ordinary cases be very small, and in consequence the battery when on short circuit through it will be practically discharged and depolarized. When the circuit is suddenly opened, the voltage of the current would, were my invention not applied, cause it to leap across the gap formed, producing a destructive spark or arc. When, however, my invention is applied as described and the circuit is suddenly opened, the current will not pass across the break, but will follow the low-resistance shunt through the battery and will continue to pass through it for a brief interval. The counter electromotive force developed by its passage will, however, at once begin to resist and quickly check and stop it as soon as the said counter electromotive force shall have attained a value equal to that of the polarizing-current and no destructive arc will pass at the break, the energy usually appearing in the spark or arc being absorbed by the battery.

The battery may consist of alternate layers of carbon and some capillary material, such as blotting-paper moistened with an electrolyte, such as a solution of potassium chlorid. In this case the pores of the carbon should be filled with paraffin-wax or other suitable material in order to prevent the electrolyte from diffusing through the said pores, thus allowing the current to pass on the electrolyte from cell to cell without producing polarization. If it is desired that this form of battery shall polarize to such an extent as to completely or very nearly stop the current, there should be used not less than one couple to approximately every two bolts on the main circuit.

Having thus fully described the principle of my invention, I will proceed to point out and describe its application to a few conspicuous cases.

Figure 1:
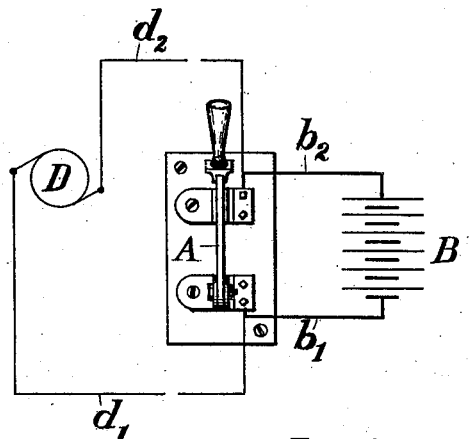

On the accompanying sheet of drawings, Figure 1 shows my invention as applied to a knife-switch A, which is shown as being in the main circuit with the dynamo D and the wires $d'$ and $d^2$. The battery B is shown connected by the wires $b'$ and $b^2$ to the terminals of the switch, being short-circuited through it and in parallel with it as regards the main circuit. With the switch closed, as shown, the polarization of B cannot exceed in amount the very small drop in potential in the main circuit due to the low resistance of the switch.

On opening the switch the sudden rush of current of greatly-increased potential which would ordinarily pass in an arc or spark is diverted therefrom and passes harmlessly into and through B, polarizing it and being quickly but gradually stopped without detriment to the switch mechanism or to the insulation in any part of the circuit.

Figure 2:
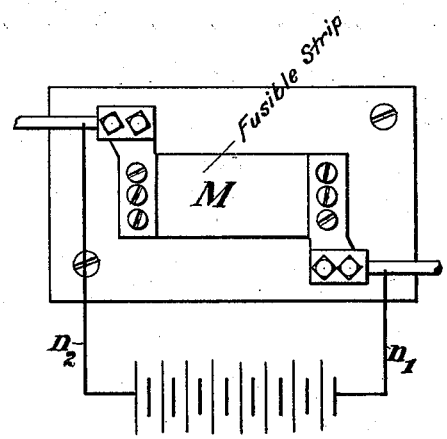

In Fig. 2 my invention is shown applied to a fuse or safety cut-out M, with which the battery N is connected by the wires $n'$ and $n^2$, so as to be in parallel with the fusible strip M. When an excess of current fuses the strip, the said current will be diverted from passing between the terminals of the fuse-block on the relatively high resistance vapor of the fuse and will be turned into, checked, and stopped by the battery in the same manner as already explained. The like manner of its application to the usual automatic safety cut-out will be readily comprehended without further explanation, the blades and jaws of the switch when opening being protected from destructive burning and fusing.

Figure 3:
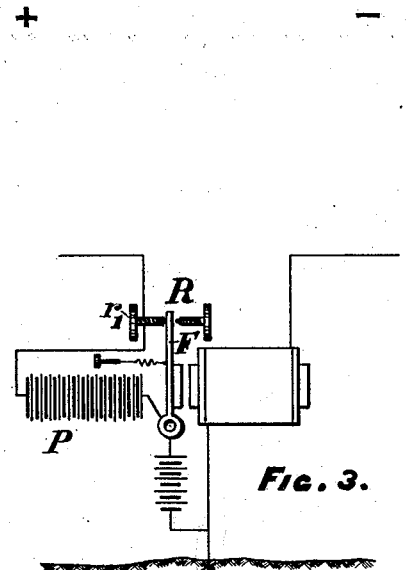

The further application of my device to a telegraphic relay is shown in Fig. 3. The battery P is connected, as shown, across the break at R between the armature F and the stop $r'$, and by its action in absorbing the current at the instant of break will prevent the welding together and sticking of the contacts, due to the slight fusing of the platinum points, as in present practice, thus making the relay much more sensitive and reliable than at present. This device may also be applied with great advantage to large electric vibrating bells, and when connected across the make-and-break mechanism will permit the use of stronger currents and larger and more vigorously-sounding bells without trouble being experienced with sticking and burning out of the contacts. The manner of the application of this device to street-car controllers is evident. It may be used in connection with the magnetic blow-outs to relieve the excessive tension that they impose, or a larger device of the same kind could be used to replace them altogether.

The application of my invention to a continuous-current bipolar open-coil dynamo-electric machine is shown diagrammatically in Fig. 4. The object of its application is to prevent the sparking and flashing of currents between the commutator and brushes and between adjacent commutator-segments in dynamo-electric machines and to avoid the excessive wear and rapid destruction of the commutator and brushes by the heat developed by the said sparks and flashes, and by the prevention of said excessive wear and rapid destruction to make practicable the use of the open-coil type of machine for generating currents of large amperage, it having been necessary heretofore in the absence of such preventive means to use the closed-coil machines, with their much more expensive commutators. The simplicity and small diameter permissible in a three-segment commutator will permit the employment of high speeds, such as are necessitated by direct connection to steam-turbines. In applying my invention to this end I connect the polarizing-batteries in shunt between the brushes and several commutator-segments. So long as a particular commutator-segment and a brush are in contact the battery connected between them is discharged and depolarized, being on short circuit. As the segment leaves the brush the battery remains in the circuit with the corresponding armature-coil, and the current which would otherwise in present practice continue to pass across the gap between the brush and the receding segment with destructive effect will with this arrangement, as described, be diverted therefrom and will pass through the battery, which will, as already described, quickly yet gradually stop it, thus cutting out the coil and allowing the brush and commutator-segment to break contact without causing a destructive spark or arc.

Referring to Fig. 4, A B C A' B' C' are six sets of batteries, arranged as shown, two in series and three in parallel across the main leads $x'$ $y'$, coming from the brushes X and Y, which bear upon the three-part commutator $d'$ $e'$ $f'$, to each one of the segments of which is connected one terminal of the three armature-coils D, E, and F, respectively. The three remaining ends of these coils are joined in the common bond H. The midpoints $d^4$ $e^4$ $f^4$ of the three series of cells AA' BB' CC' are respectively connected by wires (not shown) to the three brushes $d^3$ $e^3$ $f^3$. These brushes bear upon the three collector-rings $d^2$ $e^2$ $f^2$, as shown, these rings being connected to the three segments $d'$ $e'$ $f'$, respectively.

Having thus described the connections of the batteries to the commutator, it will be seen that the three stationary polarizing-batteries A B C are by means of the collector-rings maintained in continuous connection between the respective segments $d'$ $e'$ $f'$ and the brush X, and, further, that through the same collector-rings to batteries A' B' C' are maintained in similar continuous connection between the respective segments $d'$ $e'$ $f'$ and the brush Y. In the relative positions of the brushes and commutator shown in the figure the segment $d'$ is just on the point of leaving the brush X, having been in contact with it for the third of a revolution just being completed. During this period the battery A has been on short circuit through the segment and brush and is depolarized and discharged of any polarization or charge it may have previously acquired. As the segment $d'$ recedes from the brush X an air-gap is formed and the current in coil D would, were not my device applied, continue to pass across this gap with destructive effect. However, by my device it is diverted from so doing and will be turned into and through A, which it will polarize by its passage, as already described in this specification, and be checked and stopped without a destructive spark or arc at the brush or between the adjacent segments $d'$ and $e'$. Further, the batteries B and C will perform the same function between the segments $e'$ and $f'$, respectively, and the brush X and A', B', and C', also in like manner between $d'$, $e'$, and $f'$, respectively, and the brush Y, so that as any segment leaves either brush a depolarized battery is thereby cut in to bridge the gap and to absorb and stop the current in the coil thus cut out without destructive sparking or detriment to commutator segments or brushes. This device may also be applied to multipolar dynamos, a four-pole machine, for instance, being the practical equivalent of two bipolar machines in parallel, the number of collector-rings remaining the same as in the bipolar machine and the number of commutator-segments being in all cases one and one-half times the number of poles.

An independent effect of connecting the batteries across the main leads of an open-coil three-coil dynamo, as shown, will be to modify the pulsating electromotive force and produce a smoother and more nearly straight current curve. The batteries will take current from the leads when the electromotive force is above the average and will return it to them when below the average value.

When in applying my invention there is liability of the battery drying out, a hygroscopic electrolyte, such as a solution of calcium chlorid, may be used.

This device may be applied in every instance where trouble is caused by sparking and arcing or by the self-induced current when a circuit is opened, and I do not limit its application to the individual cases herein disclosed or limit its construction to the materials herein mentioned.

Other means of applying the principle of my invention may be employed instead of the one explained, change being made as regards the mechanism herein disclosed, provided the means covered by any one of the following claims be employed.

I therefore particularly point out and distinctly claim as my invention—

1. As a means for preventing sparking and arcing in an electric circuit carrying a current when said circuit is broken, circuit-breaking means, a current-diverting device out of circuit with said means and operable simultaneously with such breaking, said device generating an electromotive force counter to that of the current in said circuit, said device being normally short-circuited through that part of the circuit in which the break is to occur.

2. As a means for preventing sparking and arcing in an electric circuit carrying a current when said circuit is broken, circuit-breaking means, a current-diverting device, including a polarizing-battery, out of circuit with said means and operable simultaneously with such breaking, said device generating an electromotive force counter to that of the current in said circuit, said device being normally short-circuited through that part of the circuit in which the break is to occur.

3. As a means for preventing sparking and arcing in an electric circuit carrying a current when said circuit is broken, circuit-breaking means, a current-diverting device out of circuit with said means and operable simultaneously with such breaking, said device being normally short-circuited through that part of the circuit in which the break is to occur, said device generating an electromotive force counter to that of the current in said circuit, said force increasing from the instant of breaking substantially from zero to that of the current in said circuit, whereby a gradual stoppage of the electromotive force in the circuit will be provided.

4. As a means for preventing sparking and arcing in an electric circuit carrying a current when said circuit is broken, circuit-breaking means, a current-diverting device out of circuit with said means and operable simultaneously with such breaking, said device being normally short-circuited through that part of the circuit in which the break is to occur, said device generating by polarization of an electrolytic cell a counter electromotive force which varies from the instant of breaking substantially from zero to that of the current in the main circuit.

5. The combination with a polarizing-battery, means for opening an electric circuit, said battery connected in shunt with said opening means, substantially as set forth.

6. The combination with an electric circuit containing means for opening said circuit, of a number of electrolytic cells connected in series with each other and in shunt with the means for opening the circuit, such number of electrolytic cells being sufficient to practically stop the current in the main circuit when connected up with its electromotive force opposed to that of the said current in the main circuit, substantially as set forth.

Signed by me this 8th day of March, 1899.

HERBERT H. DOW.

Attest:
D. T. DAVIES,
A. E. MERKEL.